(12) United States Patent
Inose et al.

(10) Patent No.: US 11,892,106 B2
(45) Date of Patent: Feb. 6, 2024

(54) THREADED CONNECTION FOR STEEL PIPE

(71) Applicants: NIPPON STEEL CORPORATION, Tokyo (JP); VALLOUREC OIL AND GAS FRANCE, Aulnoye-Aymeries (FR)

(72) Inventors: Keita Inose, Tokyo (JP); Hikari Nakano, Tokyo (JP); Masaaki Sugino, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 285 days.

(21) Appl. No.: 17/294,474

(22) PCT Filed: Dec. 20, 2019

(86) PCT No.: PCT/JP2019/050190
§ 371 (c)(1),
(2) Date: May 17, 2021

(87) PCT Pub. No.: WO2020/137917
PCT Pub. Date: Jul. 20, 2020

(65) Prior Publication Data
US 2022/0010894 A1    Jan. 13, 2022

(30) Foreign Application Priority Data
Dec. 25, 2018  (JP) .................................. 2018-240644

(51) Int. Cl.
*F16L 15/00*  (2006.01)
*E21B 17/042*  (2006.01)

(52) U.S. Cl.
CPC ........ *F16L 15/002* (2013.01); *E21B 17/0423* (2013.01)

(58) Field of Classification Search
CPC ........................... F16L 15/002; E21B 17/0423
See application file for complete search history.

(56) References Cited

U.S. PATENT DOCUMENTS 4,795,200 A * 1/1989 Tung ................... E21B 17/0423
285/334
6,347,814 B1  2/2002 Cerruti
(Continued)

FOREIGN PATENT DOCUMENTS

EP         3409991 A1   12/2018
JP       1998089554 A    4/1998
(Continued)

*Primary Examiner* — Zachary T Dragicevich
(74) *Attorney, Agent, or Firm* — Greer Burns & Crain Ltd.

(57) ABSTRACT

A threaded connection for steel pipe is provided in which galling does not easily occur on any of the inner and outer threads. A threaded connection for steel pipe 1 includes a pin 10 and a box 20. The pin 10 includes: a nose 12; a tapered inner male thread 14; a tapered outer male thread 17; a pin inner sealing surface 13; a pin intermediate shoulder surface 18; and a pin intermediate sealing surface 16. The box 20 includes: a tapered inner female thread 24; a tapered outer female thread 27; a box inner sealing surface 23; a box intermediate shoulder surface 28; and a box intermediate sealing surface 26. Each of the inner male thread 14, outer male thread 17, inner female thread 24 and outer female thread 27 includes a perfect thread portion 141, 171, 241, 271. Each perfect thread portion includes an inner end located relatively close to the tip of the pin 10 and an outer end located relatively close to the end of the pin 10 opposite to its tip. The threaded connection for steel pipe 1 satisfies the following Expressions (1) and (2):

$$x_1 + L_1 < X_2 \quad (1), \text{ and}$$
$$u_1 + L_2 < U_2 \quad (2).$$

4 Claims, 5 Drawing Sheets

(56) References Cited

U.S. PATENT DOCUMENTS

| | | | |
|---|---|---|---|
| 6,581,980 B1* | 6/2003 | DeLange | E21B 17/0423 285/333 |
| 10,145,495 B2 | 12/2018 | Elder et al. | |
| 10,495,241 B2 | 12/2019 | Inose et al. | |
| 2002/0027363 A1 | 3/2002 | Mallis et al. | |
| 2005/0248153 A1 | 11/2005 | Sugino et al. | |
| 2009/0058085 A1 | 3/2009 | Breihan et al. | |
| 2012/0074693 A1 | 3/2012 | Mallis et al. | |
| 2017/0101830 A1 | 4/2017 | Inose et al. | |
| 2018/0223606 A1* | 8/2018 | Rueda | E21B 17/0423 |
| 2019/0211632 A1* | 7/2019 | Kawai | F16L 15/002 |
| 2020/0278057 A1* | 9/2020 | Inose | E21B 17/0423 |
| 2021/0254414 A1* | 8/2021 | Briane | E21B 17/0423 |

FOREIGN PATENT DOCUMENTS

| | | |
|---|---|---|
| JP | 2000240862 A | 9/2000 |
| JP | 2006526747 A | 11/2006 |
| JP | 2012507665 A | 3/2012 |
| JP | 2013543090 A | 11/2013 |
| WO | 2015194160 A1 | 12/2015 |
| WO | 2017104282 A1 | 6/2017 |
| WO | 2019093163 A1 | 5/2019 |

* cited by examiner

THREADED CONNECTION FOR STEEL PIPE

This is a National Phase Application filed under 35 U.S.C. § 371, of International Application No. PCT/JP2019/050190, filed Dec. 20, 2019, the contents of which are incorporated by reference.

TECHNICAL FIELD

The present disclosure relates to a threaded connection used to connect steel pipes.

BACKGROUND ART

In oil wells, natural-gas wells etc. (hereinafter collectively referred to as "oil wells"), oil-well pipes such as casing or tubing are used to mine underground resources. An oil-well pipe is composed of a series of steel pipes connected together, where a threaded connection is used to connect such pipes.

Such threaded connections for steel pipe are generally categorized as coupling type and integral type. A coupling-type connection connects a pair of pipes, one of which is a steel pipe and the other one is a coupling. In this case, a male thread is provided on the outer periphery of each of the ends of the steel pipe, while a female thread is provided on the inner periphery of each of the ends of the coupling. Then, a male thread of a steel pipe is screwed into a female thread of the coupling such that they are made up and connected. An integral connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed into the female thread of another steel pipe such that they are made up and connected.

A connection portion of a pipe end on which a male thread is provided includes an element to be inserted into a female thread, and thus is usually referred to as pin. A connection portion of a pipe end on which a female thread is provided includes an element for receiving a male thread, and thus is referred to as box. A pin and a box constitute ends of pipes and thus are tubular in shape.

In recent years, more and more deep wells in harsh environments with high temperatures and high pressures have been developed, and a threaded connection for oil-well pipe used in such a well is required to have further improved sealability. Particularly, since deep wells have higher tensile/compressive loads and external pressures, the sealability against external pressures under tensile/compressive loads needs to be improved.

A threaded connection for oil-well pipe exhibits high sealability at its seal. Generally the sealing portion of the pin has a larger diameter than the diameter of the sealing portion of the box. Thus, when the connection is made up, these sealing portions closely contact each other in a fitting manner to achieve an interference fit, thereby forming a seal using metal-to-metal contact. The difference between the diameter of the sealing portion of the pin and the diameter of the sealing portion of the box is referred to as "seal interference". The larger the seal interference, the higher the seal contact force, providing better sealability.

To improve the sealability against external pressures, it is effective to increase the wall thickness of that sealing portion of the pin on which external pressures act. This increases the swaging resistance of the sealing portion of the pin upon application of an external pressure to the threaded connection, thus reducing the decrease in the effective seal interference and reducing the decrease in the seal contact force. In addition, the threaded portions must have certain lengths and the shoulder surfaces must have certain areas to allow the connection to exhibit stable sealability even under high-tensile/compressive loads.

WO 2015/194160 (Patent Document 1) discloses a threaded connection for steel pipe that improves sealability against internal and external pressures (see paragraph [0020]). This threaded connection includes, starting from the tip of the pin (i.e., from the pipe end of the body of the oil-well pipe): shoulder surfaces, first sealing surfaces, first male/female threads, auxiliary shoulder surfaces, annular portions, second sealing surfaces, and second male/female threads (see paragraph [0063] and FIG. 6).

The first male thread will be hereinafter referred to as "inner male thread", the first female thread as "inner female thread", the second male thread as "outer male thread", the second female thread as "outer female thread", the inner male and female threads collectively as "inner threads", the outer male and female threads collectively as "outer threads", and the threaded connection including inner and outer threads as "two-step threaded connection".

JP Hei10(1998)-89554 A (Patent Document 2) discloses a slim-type threaded connection for oil-well pipe where only the torque shoulders have high strength and that provides good compression resistance and corrosion resistance (see paragraph [0016]). This threaded connection is an integral threaded connection for oil-well pipe including threads that enable threadably tightening the pin and box, a seal for providing sufficient sealability against internal or external pressures or against both kinds of pressures on the oil-well pipe, and torque shoulders that enable controlling make-up torque, where the strength of the torque shoulders is higher than those of the other portions of the connection and the body of the oil-well pipe (see paragraph [0018] and FIG. 1). This connection, too, is a "two-step threaded connection".

WO 2017/104282 (Patent Document 3) discloses a threaded connection for steel pipe that provides good sealability and also prevents crevice corrosion (see paragraph [0017]). This document specifies such an interference $\delta_{shld}$ between the intermediate shoulders that the inner shoulders contact each other at the same time as the intermediate shoulders contact each other (see paragraphs [0050] to [0057] and FIG. 3). This connection, too, is a "two-step threaded connection".

PRIOR ART

Patent Documents

[Patent Document 1] WO 2015/194160
[Patent Document 2] JP Hei10(1998)-89554 A
[Patent Document 3] WO 2017/104282
[Patent Document 4] PCT/JP2018/039964

SUMMARY OF THE INVENTION

Problems to be Solved by the Invention

The inventors newly found that, upon initiation of the make-up of a two-step threaded connection, galling can easily occur on either the inner or outer threads.

An object of the present disclosure is to provide a threaded connection for steel pipe in which galling does not easily occur on any of the inner and outer threads.

Means for Solving the Problems

The inventors analyzed galling that occurs on either the inner threads or outer threads upon initiation of the make-up of a two-step threaded connection to determine the reasons, and obtained the following new findings: When a two-step threaded connection is made up, the inner threads contact each other before the outer threads contact each other, or the outer threads contact each other before the inner threads contact each other. At the beginning of make-up, the threads are not in complete engagement, which means that make-up proceeds while the axes of the pin and box are not completely aligned, i.e., in a state called misalignment. Thus, if the inner threads contact first, the inner threads receive excessive loads; if the outer threads contact first, the outer threads receive excessive loads. The inner or outer threads that receive excessive loads experience locally high surface pressures such that galling can easily occur.

A threaded connection for steel pipe according to the present disclosure includes: a tubular pin; and a tubular box, the pin being screwed into the box such that the pin and the box are made up. The pin includes: a tapered inner male thread; a tapered outer male thread; and a pin intermediate shoulder surface. The inner male thread is provided on an outer periphery of the pin and located relatively close to a tip of the pin. The outer male thread is provided on the outer periphery of the pin and located relatively close to an end of the pin opposite to the tip. The pin intermediate shoulder surface is located between the inner male thread and the outer male thread. The box includes: a tapered inner female thread; a tapered outer female thread; and a box intermediate shoulder surface. The inner female thread is provided on an inner periphery of the box to correspond to the inner male thread. The outer female thread is provided on the inner periphery of the box to correspond to the outer male thread. The box intermediate shoulder surface faces the pin intermediate shoulder surface, the box intermediate shoulder surface being in contact with the pin intermediate shoulder surface when the pin and the box are made up.

Each of the inner male thread, the outer male thread, the inner female thread and the outer female thread includes a perfect thread portion, and each of the perfect thread portions includes an inner end located relatively close to the tip of the pin and an outer end located relatively close to the end of the pin opposite to the tip. The pin and the box, when made up, have a longitudinal cross section containing an axis of the steel pipe. An orthogonal coordinate system introduced in the longitudinal cross section has an x-axis represented by the axis of the steel pipe, a y-axis represented by a radius of the steel pipe, and an origin (0,0) represented by an intersection of a plane containing the pin intermediate shoulder surface and the box intermediate shoulder surface, on one hand, and the axis of the steel pipe, on the other hand.

The threaded connection for steel pipe satisfies the following expressions, Expressions (1) and (2):

$$x_1+L_1<X_2 \quad (1), \text{ and}$$

$$u_1+L_2<U_2 \quad (2).$$

The variables in Expressions (1) and (2) are defined as follows:

$$L_1 = \frac{(\beta_{pi} - \beta_{bi})}{\alpha_{pi}},$$

$$L_2 = \frac{(\beta_{po} - \beta_{bo})}{\alpha_{po}},$$

$$\alpha_{pi} = \frac{y_2 - y_1}{x_2 - x_1},$$

$$\alpha_{po} = \frac{v_2 - v_1}{u_2 - u_1},$$

$$\beta_{pi} = \frac{-x_1 y_2 + x_2 y_1}{x_2 - x_1},$$

$$\beta_{po} = \frac{-u_1 v_2 + u_2 v_1}{u_2 - u_1},$$

$$\beta_{bi} = \frac{-X_1 Y_2 + X_2 Y_1}{X_2 - X_1}, \text{ and}$$

$$\beta_{bo} = \frac{-U_1 V_2 + U_2 V_1}{U_2 - U_1}.$$

$(x_1,y_1)$ indicates coordinates of the inner end of the perfect thread portion of the inner male thread. $(x_2,y_2)$ indicates coordinates of the outer end of the perfect thread portion of the inner male thread. $(u_1,v_1)$ indicates coordinates of the inner end of the perfect thread portion of the outer male thread. $(u_2,v_2)$ indicates coordinates of the outer end of the perfect thread portion of the outer male thread. $(X_1,Y_1)$ indicates coordinates of the inner end of the perfect thread portion of the inner female thread. $(X_2,Y_2)$ indicates coordinates of the outer end of the perfect thread portion of the inner female thread. $(U_1,V_1)$ indicates coordinates of the inner end of the perfect thread portion of the outer female thread. $(U_2,V_2)$ indicates coordinates of the outer end of the perfect thread portion of the outer female thread.

Effects of the Invention

In the threaded connection for steel pipe described above, the inner threads contact each other substantially at the same time as the outer threads contact each other, thereby preventing galling on the inner and outer threads.

EMBODIMENTS FOR CARRYING OUT THE INVENTION

[Arrangement 1]

Figure 1:
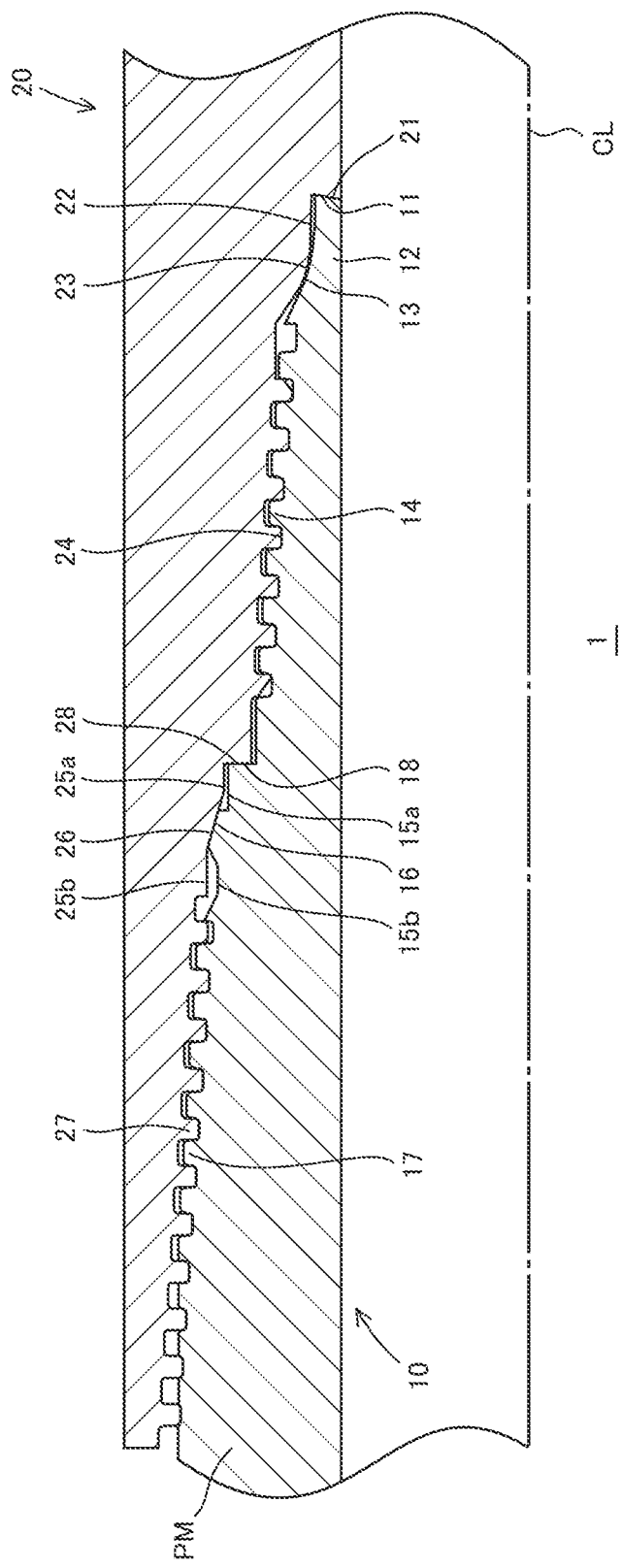
FIG. 1 is a longitudinal cross-sectional view of a threaded connection for steel pipe according to an embodiment.

The threaded connection for steel pipe according to the present embodiment includes: a tubular pin; and a tubular box, the pin being screwed into the box such that the pin and the box are made up. The pin includes: a tapered inner male thread; a tapered outer male thread; and a pin intermediate shoulder surface. The inner male thread is provided on an outer periphery of the pin and located relatively close to a tip of the pin. The outer male thread is provided on the outer periphery of the pin and located relatively close to an end of the pin opposite to the tip. The pin intermediate shoulder surface is located between the inner male thread and the outer male thread. The box includes: a tapered inner female thread; a tapered outer female thread; and a box intermediate shoulder surface. The inner female thread is provided on an inner periphery of the box to correspond to the inner male thread. The outer female thread is provided on the inner periphery of the box to correspond to the outer male thread. The box intermediate shoulder surface faces the pin intermediate shoulder surface, the box intermediate shoulder surface being in contact with the pin intermediate shoulder surface when the pin and the box are made up.

Each of the inner male thread, the outer male thread, the inner female thread and the outer female thread includes a perfect thread portion, and each of the perfect thread portions includes an inner end located relatively close to the tip of the pin and an outer end located relatively close to the end of the pin opposite to the tip. The pin and the box, when made up, have a longitudinal cross section containing an axis of the steel pipe. An orthogonal coordinate system introduced in the longitudinal cross section has an x-axis represented by the axis of the steel pipe, a y-axis represented by a radius of the steel pipe, and an origin (0,0) represented by an intersection of a plane containing the pin intermediate shoulder surface and the box intermediate shoulder surface, on one hand, and the axis of the steel pipe, on the other hand.

The threaded connection for steel pipe satisfies the following expressions, Expressions (1) and (2):

$$x_1 + L_1 < x_2 \quad (1), \text{ and}$$

$$u_1 + L_2 < u_2 \quad (2).$$

The variables in Expressions (1) and (2) are defined as follows:

$$L_1 = \frac{(\beta_{pi} - \beta_{bi})}{\alpha_{pi}},$$

$$L_2 = \frac{(\beta_{po} - \beta_{bo})}{\alpha_{po}},$$

$$\alpha_{pi} = \frac{y_2 - y_1}{x_2 - x_1},$$

$$\alpha_{po} = \frac{v_2 - v_1}{u_2 - u_1},$$

$$\beta_{pi} = \frac{-x_1 y_2 + x_2 y_1}{x_2 - x_1},$$

$$\beta_{po} = \frac{-u_1 v_2 + u_2 v_1}{u_2 - u_1},$$

$$\beta_{bi} = \frac{-X_1 Y_2 + X_2 Y_1}{X_2 - X_1}, \text{ and}$$

$$\beta_{bo} = \frac{-U_1 V_2 + U_2 V_1}{U_2 - U_1}.$$

$(x_1, y_1)$ indicates coordinates of the inner end of the perfect thread portion of the inner male thread. $(x_2, y_2)$ indicates coordinates of the outer end of the perfect thread portion of the inner male thread. $(u_1, v_1)$ indicates coordinates of the inner end of the perfect thread portion of the outer male thread. $(u_2, v_2)$ indicates coordinates of the outer end of the perfect thread portion of the outer male thread. $(X_1, Y_1)$ indicates coordinates of the inner end of the perfect thread portion of the inner female thread. $(X_2, Y_2)$ indicates coordinates of the outer end of the perfect thread portion of the inner female thread. $(U_1, V_1)$ indicates coordinates of the inner end of the perfect thread portion of the outer female thread. $(U_2, V_2)$ indicates coordinates of the outer end of the perfect thread portion of the outer female thread.

In Arrangement 1, the inner threads contact each other substantially at the same time as the outer threads contact each other, thereby preventing galling on the inner and outer threads.

[Arrangement 2]

Starting from the threaded connection for steel pipe of Arrangement 1, the pin may further include: a nose provided at the tip of the pin; a pin inner sealing surface located between the nose and the inner male thread; and a pin intermediate sealing surface provided between the outer male thread and the pin intermediate shoulder surface. The box may further include: a box inner sealing surface facing the pin inner sealing surface, the box inner sealing surface being in contact with the pin inner sealing surface when the pin and the box are made up; and a box intermediate sealing surface facing the pin intermediate sealing surface, the box intermediate sealing surface being in contact with the pin intermediate sealing surface when the pin and the box are made up.

[Arrangement 3]

Starting from threaded connection for steel pipe of Arrangement 1 or 2, the pin intermediate sealing surface may have a smaller diameter than an envelope line of a crest of the outer female thread.

Arrangement 3 prevents the outer female thread and pin intermediate sealing surface from contacting each other.

[Arrangement 4]

Starting from the threaded connection for steel pipe of any one of Arrangements 1 to 3, the threaded connection may further satisfy the following expressions, Expressions (3) and (4):

$$X_2 - (x_1 + L_1) \geq 5 \text{ mm} \quad (3), \text{ and}$$

$$U_2 - (u_1 + L_2) \geq 5 \text{ mm} \quad (4).$$

In Arrangement 4, the inner threads may contact each other along 5 mm or more, and the outer threads may contact each other along 5 mm or more.

Now, the present embodiment will be described in detail with reference to the drawings. The same or corresponding portions in drawings are labeled with the same characters, and the same description will not be repeated.

[Configuration of Threaded Connection for Steel Pipe]

Referring to FIG. 1, a threaded connection for steel pipe according to the present embodiment, denoted by 1, is a coupling-type threaded connection that includes a tubular pin 10 and a tubular box 20 to be made up on the pin 10 when the pin 10 is screwed in.

The pin 10 includes a nose 12, a tapered inner male thread 14, a tapered outer male thread 17, a pin inner sealing surface 13, a pin intermediate shoulder surface 18, a pin intermediate sealing surface 16, and a pin annular portion 15a.

The nose 12 is provided at the tip of the pin 10. The inner male thread 14 is provided on the outer periphery of the pin 10 and located relatively close to the tip of the pin 10. The outer male thread 17 is provided on the outer periphery of the pin 10 and located relatively close to the end of the pin 10 opposite to the tip. The pin inner sealing surface 13 is located between the nose 12 and inner male thread 14. The pin intermediate shoulder surface 18 is located between the inner and outer male threads 14 and 17. The pin intermediate sealing surface 16 is located between the outer male thread 17 and pin intermediate shoulder surface 18. The pin annular portion 15a is located between the pin intermediate shoulder surface 18 and pin intermediate sealing surface 16.

The box 20 includes a recess 22, a tapered inner female thread 24, a tapered outer female thread 27, a box inner sealing surface 23, a box intermediate shoulder surface 28, a box intermediate sealing surface 26, and a box annular portion 25a.

The recess 22 corresponds to the nose 12. The inner female thread 24 is provided on the inner periphery of the box 20 to correspond to the inner male thread 14. The outer female thread 27 is provided on the inner periphery of the box 20 to correspond to the outer male thread 17. The box inner sealing surface 23 faces the pin inner sealing surface 13, and is in contact with the pin inner sealing surface 13 when the pin 10 and box 20 are made up. The box intermediate shoulder surface 28 faces the pin intermediate shoulder surface 18, and is in contact with the pin intermediate shoulder surface 18 when the pin 10 and box 20 are made up. The box intermediate sealing surface 26 faces the pin intermediate sealing surface 16, and is in contact with the pin intermediate sealing surface 16 when the pin 10 and box 20 are made up. The box annular portion 25a faces the pin annular portion 15a, and is spaced apart from the pin annular portion 15a when the pin 10 and box 20 are made up.

The inner male and female threads 14 and 24 will be hereinafter sometimes collectively referred to as "inner threads 14 and 24". The outer male and female threads 17 and 27 will be sometimes collectively referred to as "outer threads 17 and 27". This threaded connection 1 is a two-step threaded connection including the inner threads 14 and 24 and the outer threads 17 and 27.

Each of the pin inner sealing surface 13 and pin intermediate sealing surface 16 has the shape of a face equivalent to the periphery of a truncated cone decreasing in diameter toward the tip, or the shape obtained by combining the periphery of such a truncated cone and a face equivalent to the periphery of a solid of revolution obtained by rotating a curve, such as an arc, about the axis of the steel pipe (hereinafter sometimes simply referred to as "pipe axis").

The nose 12 is tubular in shape and adjacent to the pin inner sealing surface 13 in the direction of the pipe axis CL. The outer peripheral surface of the nose 12 may be a taper surface with the same slope as the taper of the pin inner sealing surface 13, or with a smaller (i.e., gentler) or lager (i.e., steeper) slope. More exactly if the outer peripheral surface of the nose 12 is a taper surface, this outer peripheral surface has the shape of a face equivalent to the periphery of a truncated cone decreasing in diameter toward the tip, or the shape obtained by combining the periphery of such a truncated cone and a face equivalent to the periphery of a solid of revolution obtained by rotating a curve, such as an arc, about the pipe axis CL.

The pin 10 further includes a pin auxiliary shoulder surface 11 provided at the tip of the pin 10. The box 20 further includes a box auxiliary shoulder surface 21 adapted to face the pin auxiliary shoulder surface 11. The pin auxiliary shoulder surface 11 may or may not be in contact with the box auxiliary shoulder surface 21 when the pin 10 and box 20 are made up.

The pin auxiliary shoulder surface 11 is an annular surface generally perpendicular to the pipe axis CL. More exactly the auxiliary shoulder surface 11 is slightly inclined such that its outer periphery is located further toward the tip of the pin 10.

The intermediate shoulder surface 18 is located between the inner male thread 14 and pin annular portion 15a. The intermediate shoulder surface 18 is adjacent to the pin annular portion 15a. In the present embodiment, the intermediate shoulder surface 18 is an annular surface perpendicular to the pipe axis CL. Alternatively similar to the auxiliary shoulder surface 11, the intermediate shoulder surface 18 may be slightly inclined such that its outer periphery is located further toward the tip of the pin 10.

The pin annular portion 15a is adjacent to forward of the pin intermediate sealing surface 16 in the direction of the pipe axis CL. The inner male thread 14 is adjacent to the pin annular portion 15a. The pin annular portion 15b is adjacent to rearward of the pin intermediate sealing surface 16 in the direction of the pipe axis CL. The outer male thread 17 is adjacent to the pin annular portion 15b. The outer peripheral surface of the pin annular portion 15a may have any shape that can ensure stiffness, and may be a cylindrical surface or a taper surface with a smaller (or gentler) slope than the thread taper of the inner male thread 14, or a curved surface. The same applies to the outer peripheral surface of the pin annular portion 15b.

The box inner sealing surface 23 protrudes toward the pin inner sealing surface 13. Alternatively the box inner sealing surface 23 may not protrude. In such implementations, the pin inner sealing surface 13 protrudes toward the box inner sealing surface 23.

The inner male and female threads 14 and 24 are tapered threads that can engage each other, and are trapezoidal threads. The outer male and female threads 17 and 27 are tapered threads that can engage each other, and are trapezoidal threads.

The taper surfaces of the inner threads 14 and 24 are located closer to the pipe axis CL than the taper surfaces of the outer threads 17 and 27 are. This is because the intermediate shoulder surfaces 18 and 28 are provided between the inner threads 14 and 24, on one hand, and the outer threads 17 and 27, on the other hand. Thus, the portions of the pin 10 associated with the inner male thread 14 and pin inner sealing surface 13 have relatively small outer diameters and thus have relatively small wall thicknesses. On the other hand, the portions of the pin 10 associated with the pin inner sealing surface 16 and outer male thread 17 have relatively large outer diameters and thus have relatively large wall thicknesses.

The inner male and female threads 14 and 24 allow each other to be screwed in, and, when the connection is made up, closely contact each other in a fitting manner to achieve an interference fit. Similarly the outer male and female threads 17 and 27 achieve an interference fit.

As the pin 10 is screwed in, the inner sealing surfaces 13 and 23 contact each other and the intermediate sealing surfaces 16 and 26 contact each other and, when the connection is made up, each pair comes into close contact in a fitting manner to achieve an interference fit. Thus, the inner sealing surfaces 13 and 23 and the intermediate sealing surfaces 16 and 26 form an inner seal and an intermediate seal, respectively using metal-to-metal contact.

When the connection is made up, a clearance is formed between the nose 12 of the pin 10 and the recess 22 of the box 20. A clearance is also formed between the pin and box annular portions 15a and 25a. A clearance is also formed between the pin and box annular portions 15b and 25b.

The intermediate shoulder surfaces 18 and 28 are in contact with each other when the connection is made up. When the intermediate shoulder surfaces 18 and 28 are in press contact a tightening axial force is applied, mainly to the load flank of the outer male thread 17.

If a pin auxiliary shoulder surface 11 is provided on the tip of the pin 10, this reduces the damage caused by compressive loads; thus, further improvements in performance can be expected.

Figure 2:
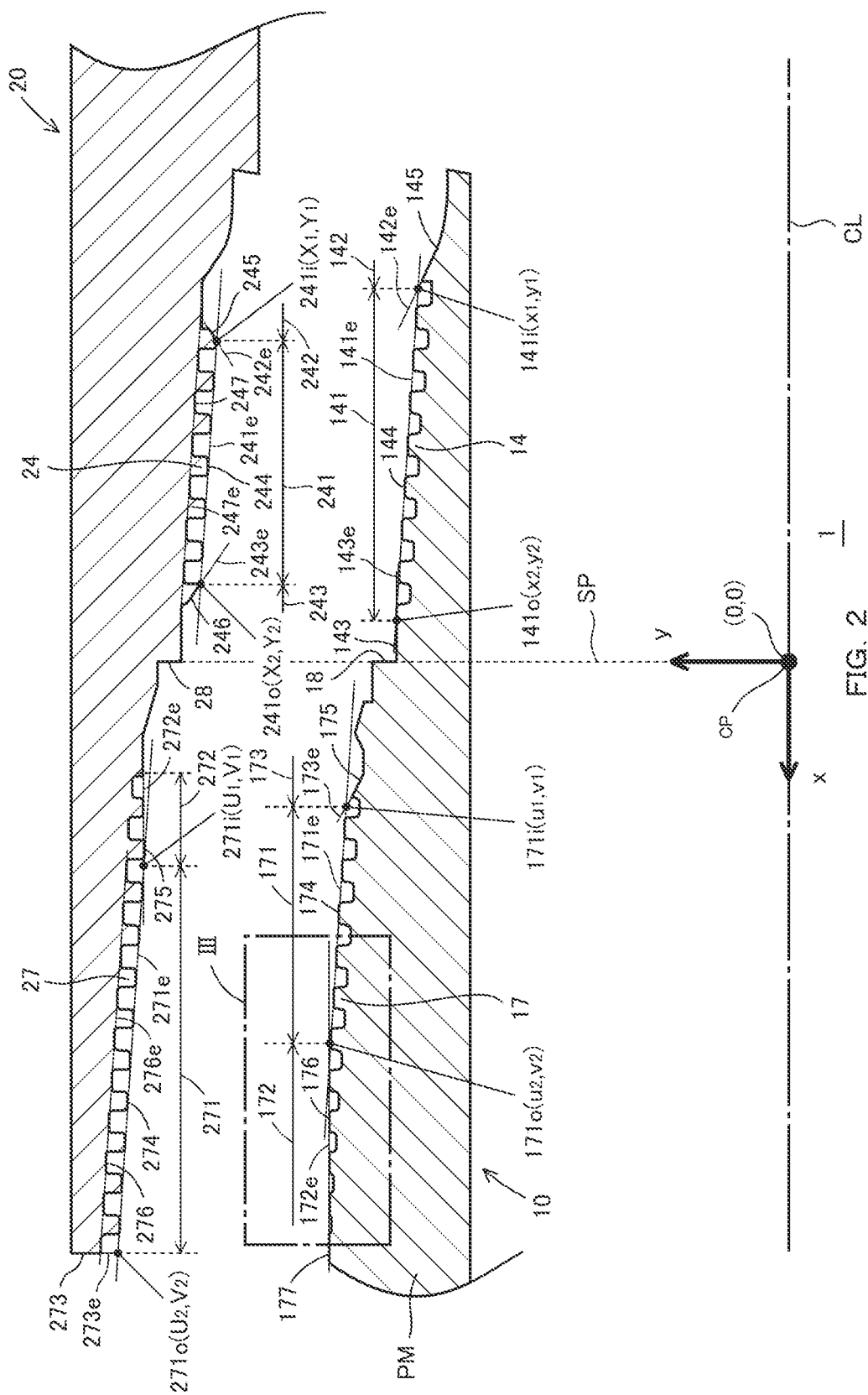
FIG. 2 is a longitudinal cross-sectional view of the threaded connection shown in FIG. 1 as divided into the pin and box and shown in an orthogonal coordinate system.

Referring to FIG. 2, the inner male thread 14 includes a perfect thread portion (hereinafter referred to as "pin inner perfect thread portion") 141. The outer male thread 17 includes a perfect thread portion (hereinafter referred to as "pin outer perfect thread portion") 171. The inner female thread 24 includes a perfect thread portion (hereinafter referred to as "box inner perfect thread portion") 241. The outer female thread 27 includes a perfect thread portion (hereinafter referred to as box outer perfect thread portion") 271.

The pin inner perfect thread portion 141 includes an inner end 141i located relatively close to the tip of the pin 10 and an outer end 141o located relatively close to the end of the pin 10 opposite to its tip. The pin outer perfect thread portion 171 includes an inner end 171i located relatively close to the tip of the pin 10 and an outer end 171o located relatively close to the end of the pin 10 opposite to its tip. The box inner perfect thread portion 241 includes an inner end 241i located relatively close to the tip of the pin 10 (i.e., relatively close to the end of the box 20 opposite to its tip) and an outer end 241o located relatively close to the end of the pin 10 opposite to its tip (i.e., relatively close to the tip of the box 20). The box outer perfect thread portion 271 includes an inner end 271i located relatively close to the tip of the pin 10 (i.e., relatively close to the end of the box 20 opposite to its tip) and an outer end 271o located relatively close to the end of the pin 10 opposite to its tip (i.e., relatively close to the tip of the box 20).

The inner male thread 14 further includes a bevel (hereinafter referred to as "pin inner bevel") 142. The outer male thread 17 further includes an imperfect thread portion (hereinafter referred to as "pin outer imperfect thread portion") 172 and a bevel (hereinafter referred to as "pin outer bevel") 173. The inner female thread 24 further includes bevels (hereinafter referred to as "box inner bevels") 242 and 243. The outer female thread 27 includes an imperfect thread portion (hereinafter referred to as box outer imperfect thread portion") 272.

In a perfect thread portion, both the crest (i.e., thread ridge) and root (i.e., thread groove) have a perfect, predetermined shape. In an imperfect thread portion, the crest (i.e., thread ridge) or root (i.e., thread groove) have an imperfect shape. A bevel is also called "inclined surface", and is a type of imperfect thread portion.

Table 1 shows combinations of a perfect thread portion and an imperfect thread portion fitted together.

thread portions 241 and 271 of the box 20 are concerned, the roots of the male threads 14 and 17 are in contact with the crests 244 and 274 of the female threads 24 and 27.

The inner end 141i of the pin inner perfect thread portion 141 is located at the intersection of the envelope line 141e of the crests 144 of the pin inner perfect thread portion 141 and the envelope line 142e of the crests 145 of the pin inner bevel 142. The outer end 141o of the pin inner perfect thread portion 141 is located at the intersection of the envelope line 141e of the crests of the pin inner perfect thread portion 141 and the extension line 143e of the outer periphery 143 of the pin 10. The inner end 171i of the pin outer perfect thread portion 171 is located at the intersection of the envelope line 171e of the crests 174 of the pin outer perfect thread portion 171 and the envelope line 173e of the crests 175 of the pin outer bevel 173. The outer end 171o of the pin outer perfect thread portion 171 is located at the intersection of the envelope line 171e of the crests 174 of the pin outer perfect thread portion 171 and the envelope line 172e of the crests 176 of the pin outer imperfect thread portion 172 (or extension line of the outer periphery 177 of the pin 10, which is the same as the crests 176).

The inner end 241i of the box inner perfect thread portion 241 is located at the intersection of the envelope line 241e of the crests 244 of the box inner perfect thread portion 241 and the envelope line 242e of the crests 245 of the box inner bevel 242. The outer end 241o of the box inner perfect thread portion 241 is located at the intersection of the envelope line 241e of the crests 244 of the box inner perfect thread portion 241 and the extension line 243e of the crests 246 of the box inner bevel 243. The inner end 271i of the box outer perfect thread portion 271 is located at the intersection of the envelope line 271e of the crests 274 of the box outer perfect thread portion 271 and the envelope line 272e of the crests 275 of the box outer imperfect thread portion 272. The outer end 271o of the box outer perfect thread portion 271 is located at the intersection of the envelope line 271e of the crests 274 of the box outer perfect thread portion 271 and the extension line 273e of the end surface 273 of the box 20.

The envelope lines and extension lines are represented as lines in a cross-sectional view; however, since the pin 10 and box 20 are tubular in shape, they are, in reality planes. Accordingly although the inner and outer ends are represented as points in a cross-sectional view, they are, in reality lines.

More specifically the envelope lines 141e, 171e, 241e and 271e of the crests 144, 174, 244 and 274 are defined as follows: For example, the crests 174 of the pin outer perfect thread portion 171 may be tapered, as shown in FIG. 3, or may be step-wise shaped, as shown in FIG. 4.

Figure 3:
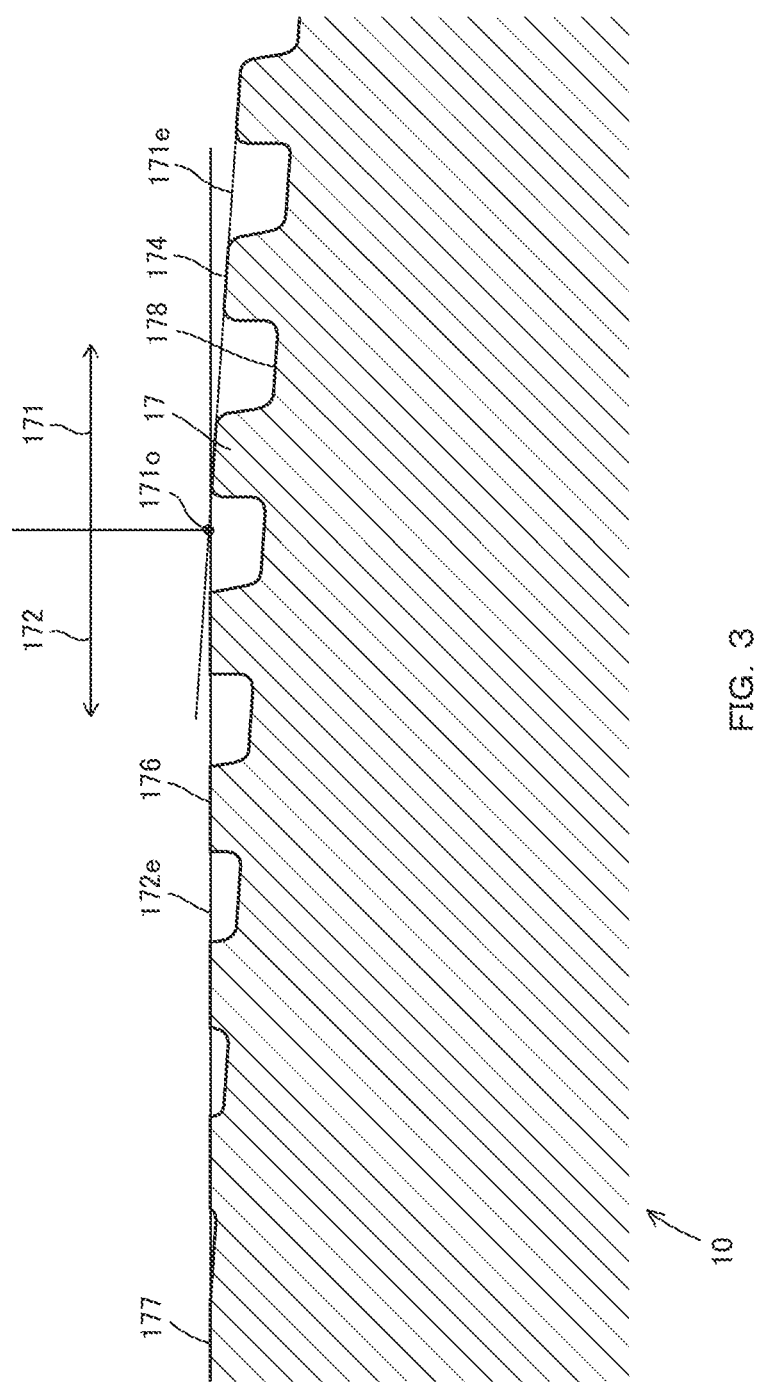
FIG. 3 is an enlarged view of an example of portion III in FIG. 2.
Figure 4:
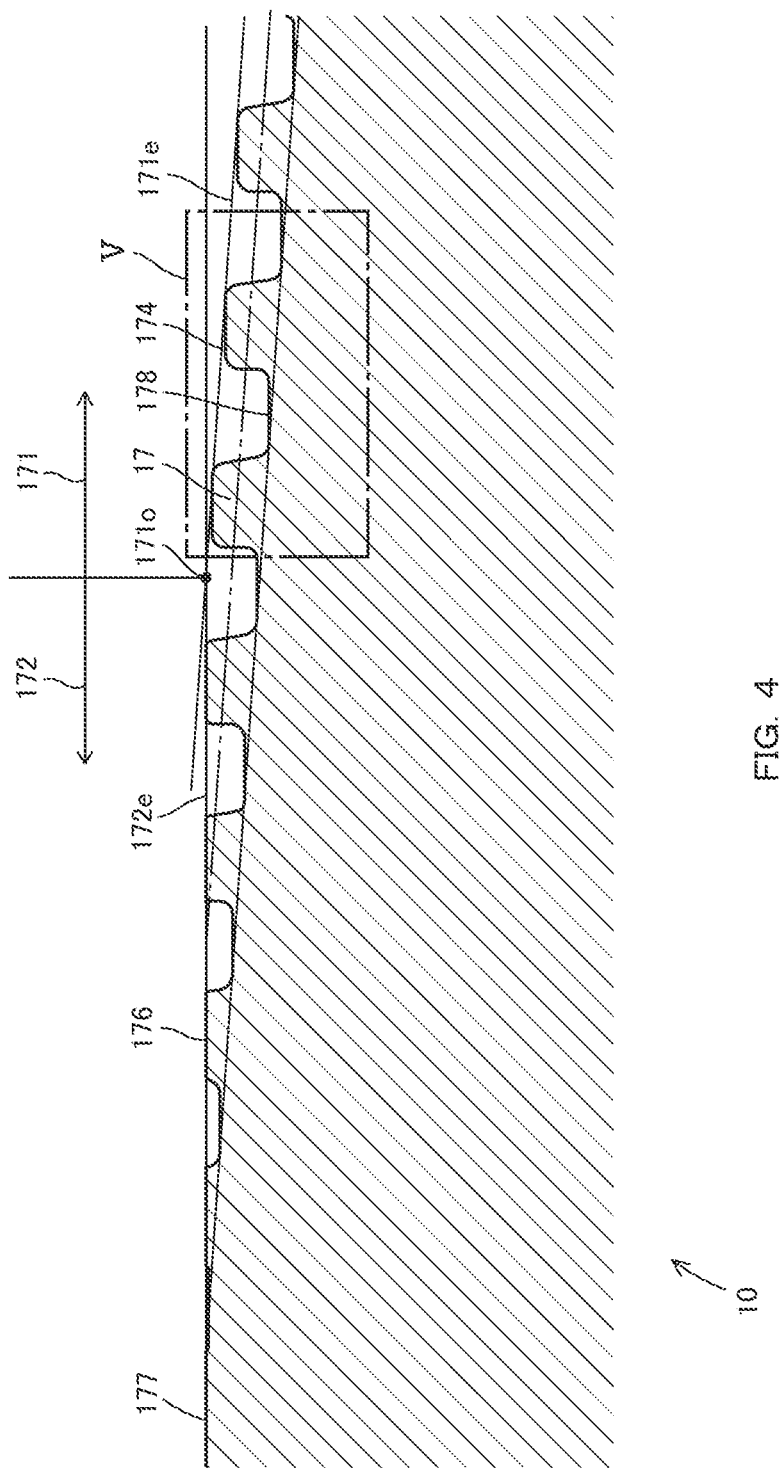
FIG. 4 is an enlarged view of another example of portion III in FIG. 2.

If the crests 174 are tapered as shown in FIG. 3, the roots 178 are also tapered. The taper angles of the crests 174 and

TABLE 1

| Pin | Box | Crest of male thread (root of female thread) | Root of male thread (crest of female thread) |
|---|---|---|---|
| perfect thread portion | perfect thread portion | non-contact | contact |
| perfect thread portion | imperfect thread portion | non-contact | non-contact |
| imperfect thread portion | perfect thread portion | non-contact | contact |
| imperfect thread portion | imperfect thread portion | non-contact | non-contact |

As shown in Table 1, according to the present embodiment, the crests 144 and 176 of the male threads 14 and 17 are not always in contact with the roots 247 and 276 of the female threads 24 and 27. However, as far as the perfect roots 178 are equal to the taper angle of the outer male thread 17. In a cross-sectional view, the crests 174 are positioned on one and the same straight line. This straight line defines the envelope line 171e of the crests 174. As discussed above, the outer end 171o of the pin outer perfect thread portion 171 is located at the intersection of the envelope line 171e of the crests 174 of the pin outer perfect thread portion 171 and the envelope line 172e of the crests 176 of the pin outer imperfect thread portion 172, i.e., extension line 172e of the outer periphery 177 of the pin 10.

Figure 5:
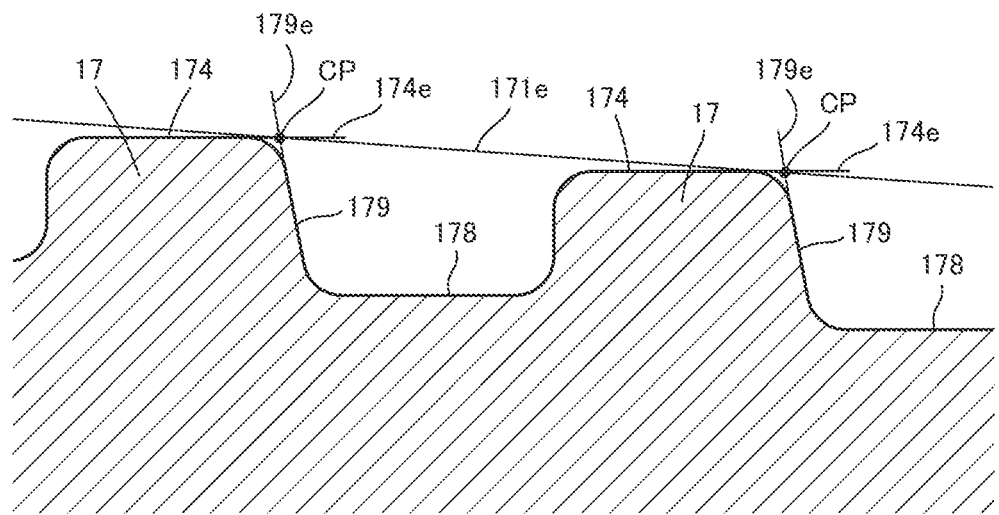
FIG. 5 is an enlarged view of portion V in FIG. 4.

On the other hand, if the crests 174 are step-wise shaped as shown in FIG. 4, the roots 178 are also step-wise shaped. The crests 174 and roots 178 are parallel to the pipe axis CL. In a cross-sectional view, the crests 174 are not positioned on one and the same straight line. Thus, in this case, the envelope line 171e is defined as a straight line passing through the intersection CP of the extension line 174e of the crests 174 and the extension line 179e of a stab flank 179, as shown in FIG. 5. A stab flank 179 is the one of the flanks of the outer male thread 17 that faces the tip of the pin 10. Again, as shown in FIG. 4, the outer end 171o of the pin outer perfect thread portion 171 is located at the intersection of the envelope line 171e of the crests 174 of the pin outer perfect thread portion 171 and the envelope line 172e of the crests 176 of the pin outer imperfect thread portion 172, i.e., extension line 172e of the outer periphery 177 of the pin 10.

As shown in FIG. 1, the pin 10 and box 20 that have been made up have a longitudinal cross section containing the pipe axis CL. As shown in FIG. 2, an orthogonal coordinate system introduced in the longitudinal cross-sectional view has an x-axis represented by the pipe axis CL, a y-axis represented by a radius of the steel pipe, and an origin (0,0) represented by the intersection CP of a plane SP containing the pin intermediate shoulder surface 18 and box intermediate shoulder surface 28, and the pipe axis CL.

This two-step threaded connection 1 satisfies the following expressions, Expressions (1) and (2):

$$x_1 + L_1 < X_2 \tag{1}$$

and $$u_1 + L_2 < U_2 \tag{2}$$

The variables in Expressions (1) and (2) are defined as follows:

$$L_1 = \frac{(\beta_{pi} - \beta_{bi})}{\alpha_{pi}},$$

$$L_2 = \frac{(\beta_{po} - \beta_{bo})}{\alpha_{po}},$$

$$\alpha_{pi} = \frac{y_2 - y_1}{x_2 - x_1},$$

$$\alpha_{po} = \frac{v_2 - v_1}{u_2 - u_1},$$

$$\beta_{pi} = \frac{-x_1 y_2 + x_2 y_1}{x_2 - x_1},$$

$$\beta_{po} = \frac{-u_1 v_2 + u_2 v_1}{u_2 - u_1},$$

$$\beta_{bi} = \frac{-X_1 Y_2 + X_2 Y_1}{X_2 - X_1}, \text{ and}$$

$$\beta_{bo} = \frac{-U_1 V_2 + U_2 V_1}{U_2 - U_1}.$$

The coordinates in FIG. 2 are defined as follows: $(x_1, y_1)$: coordinates of the inner end 141i of the pin inner perfect thread portion 141; $(x_2, y_2)$: coordinates of the outer end 141o of the pin inner perfect thread portion 141; $(u_1, v_1)$: coordinates of the inner end 171i of the pin outer perfect thread portion 171; $(u_2, v_2)$: coordinates of the outer end 171o of the pin outer perfect thread portion 171; $(X_1, Y_1)$: coordinates of the inner end 241i of the box inner perfect thread portion 241; $(X_2, Y_2)$: coordinates of the outer end 241o of the box inner perfect thread portion 241; $(U_1, V_1)$: coordinates of the inner end 271i of the box outer perfect thread portion 271; and $(U_2, V_2)$: coordinates of the outer end 271o of the box outer perfect thread portion 271.

In the above expressions, L1 is the distance that the pin 10 advances relative to the box 20 in the direction of the pipe axis CL during make-up of the inner threads 14 and 24 starting at the initiation of make-up (i.e., when the envelope line 141e of the crests 144 of the pin inner perfect thread portion 141 reaches the envelope line 241e of the crests 244 of the box inner perfect thread portion 241; hereinafter referred to as "at initiation of inner-thread make-up") until the completion of make-up (i.e., when the pin intermediate shoulder surface 18 reaches the box intermediate shoulder surface 28).

L2 is the distance that the pin 10 advances relative to the box 20 in the direction of the pipe axis CL during make-up of the outer threads 17 and 27 starting at the initiation of make-up (i.e., when the envelope line 171e of the crests 174 of the pin outer perfect thread portion 171 reaches the envelope line 271e of the crests 274 of the box outer perfect thread portion 271; hereinafter referred to as "at initiation of outer-thread make-up") until the completion of make-up (i.e., when the pin intermediate shoulder surface 18 reaches the box intermediate shoulder surface 28).

$\alpha_{pi}$ indicates the inclination (or slope) of the envelope line 141e relative to the x-axis. $\alpha_{po}$ indicates the inclination of the envelope line 171e relative to the x-axis. $\beta_{pi}$ indicates the intercept of the envelope line 141e with the y-axis. $\beta_{po}$ indicates the intercept of the envelope line 171e with the y-axis. $\beta_{bi}$ indicates the intercept of the envelope line 241e with the y-axis. $\beta_{bo}$ indicates the intercept of the envelope line 271e with the y-axis.

[Effects of Threaded Connection for Steel Pipe]

In the two-step threaded connection 1 having the above-described configuration, the inner threads 14 and 24 contact each other at the same time as the outer threads 17 and 27 contact each other, thereby preventing galling on the inner threads 14 and 24 and outer threads 17 and 27. The reason for this will be described in detail below.

The envelope line 141e of the crests 144 of the pin inner perfect thread portion 141 is represented by the following expression, Expression (5):

$$y = \frac{y_2 - y_1}{x_2 - x_1} x + \frac{-x_1 y_2 + x_2 y_1}{x_2 - x_1} = \alpha_{pi} x + \beta_{pi}. \tag{5}$$

The envelope line 171e of the crests 174 of the pin outer perfect thread portion 171 is represented by the following expression, Expression (6):

$$y = \frac{v_2 - v_1}{u_2 - u_1} x + \frac{-u_1 v_2 + u_2 v_1}{u_2 - u_1} = \alpha_{po} x + \beta_{po}. \tag{6}$$

The envelope line 241e of the crests 244 of the box inner perfect thread portion 241 is represented by the following expression, Expression (7). In Expression (7), $\alpha_{bi}$ indicates the inclination of the envelope line 241e relative to the x-axis:

$$y = \frac{Y_2 - Y_1}{X_2 - X_1} x + \frac{-X_1 Y_2 + X_2 Y_1}{X_2 - X_1} = \alpha_{bi} x + \beta_{bi}. \tag{7}$$

The envelope line 271e of the crests 274 of the box outer perfect thread portion 271 is represented by the following expression, Expression (8). In Expression (8), $\alpha_{bo}$ indicates the inclination of the envelope 271e relative to the x-axis.

$$y = \frac{V_2 - V_1}{U_2 - U_1} x + \frac{-U_1 V_2 + U_2 V_1}{U_2 - U_1} = \alpha_{bo} x + \beta_{bo}. \quad (8)$$

Figure 6:
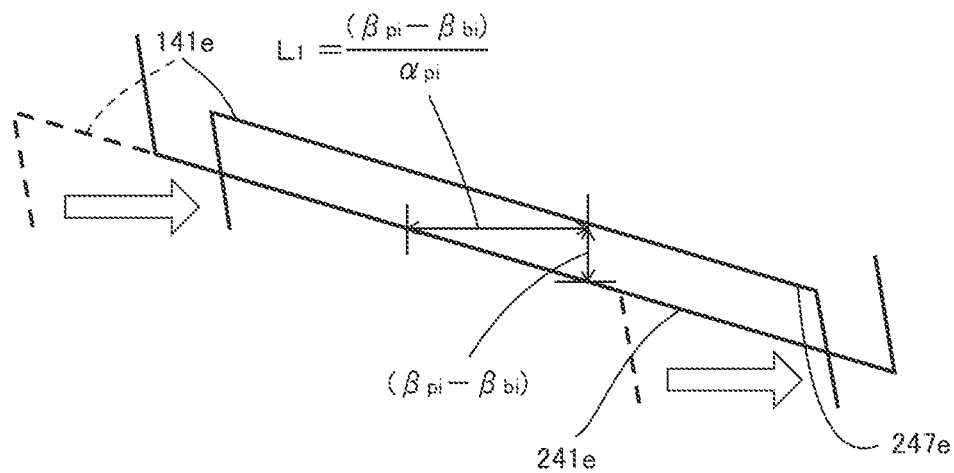
FIG. 6 is a longitudinal cross-sectional view of the inner threads in FIGS. 1 and 2, showing how they move starting at the initiation of make-up until the completion of make-up.

Referring to FIG. 6, during make-up of the inner threads 14 and 24, the pin 10 advances relative to the box 20 by the distance L1 in the direction of the pipe axis CL starting at the initiation of inner-thread make-up until the completion of inner-thread make-up. The distance L1 is represented by the following expressions, Expressions (9) and (10):

$$L_1 = \frac{(\beta_{pi} - \beta_{bi})}{\alpha_{pi}}, \text{ and} \quad (9)$$

$$L_1 = \frac{(\beta_{pi} - \beta_{bi})}{\alpha_{bi}}. \quad (10)$$

Similarly during make-up of the outer threads 17 and 27, the pin 10 advances relative to the box 20 by the distance L2 in the direction of the pipe axis CL starting at the initiation of outer-thread make-up until the completion of outer-thread make-up. The distance L2 is represented by the following expressions, Expressions (11) and (12):

$$L_2 = \frac{(\beta_{po} - \beta_{bo})}{\alpha_{po}}, \text{ and} \quad (11)$$

$$L_2 = \frac{(\beta_{po} - \beta_{bo})}{\alpha_{bo}}. \quad (12)$$

Since the taper angles of the pin 10 and box 20 are substantially equal, $\alpha_{pi} \approx \alpha_{bi}$ and $\alpha_{po} \approx \alpha_{bo}$ are true.

In order that the inner threads 14 and 24 begin to be in contact at the same time as the outer threads 17 and 27, it is only required that, at the initiation of inner-thread make-up, the x coordinate ($x_1$) of the inner end 141i of the pin inner perfect thread portion 141 be smaller than the x coordinate ($X_2$) of the outer end 241o of the box inner perfect thread portion 241 and, at the initiation of outer-thread make-up, the x coordinate ($u_1$) of the inner end 171i of the pin outer perfect thread portion 171 be smaller than the x coordinate ($U_2$) of the outer end 271o of the box outer perfect thread portion 271, and thus it is only required that Expressions (1) and (2) be satisfied:

$$x_1 + L_1 < X_2 \quad (1), \text{ and}$$

$$u_1 + L_2 < U_2 \quad (2).$$

In the above-described two-step threaded connection 1, the pin intermediate sealing surface 16 may have a diameter smaller than that of the envelope line 271e of the crests 274 of the outer female thread 27. This will avoid a contact between the outer female thread 27 and pin intermediate sealing surface 18.

The above-described two-step threaded connection 1 may further satisfy the following expressions, Expressions (3) and (4). In this case, the inner threads 14 and 24 and the outer threads 17 and 27 will have a contact length of 5 mm or more.

$$X_2 - (x_1 + L_1) \geq 5 \text{ mm} \quad (3), \text{ and}$$

$$U_2 - (u_1 + L_2) \geq 5 \text{ mm} \quad (4).$$

The threaded connection according to the above-described embodiment may not only be applied to a coupling-type connection, but also to an integral connection.

In the above-described two-step threaded connection 1, the nose 12, pin inner sealing surface 13, pin intermediate sealing surface 16, box inner sealing surface 23 and box intermediate sealing surface 26 may not be provided.

Otherwise, the present disclosure is not limited to the above-described embodiment, and various modifications are possible without departing from the spirit of the present disclosure.

Examples

To verify the effects of the threaded connection for steel pipe according to the present embodiment, actual samples were used to conduct galling-resistance evaluation tests.

<Test Conditions>

A plurality of test specimens with different dimensions were used to conduct repeated make-up/break-out tests as defined by the ISO 13679 standard to determine whether galling occurred. Each test specimen was a coupling-type threaded connection having the basic configuration shown in FIG. 1. The common test conditions are provided below.

(1) Dimensions of Steel Pipe

7⅝ [inch]×1.06 [inch] (outer diameter: 193.7 [mm], wall thickness: 27.0 [mm])

10⅛ [inch]×0.8 [inch] (outer diameter: 257.2 [mm], wall thickness: 20.3 [mm])

(2) Grade of Steel Pipe

P110 in accordance with the API standards (carbon steel with a nominal yield stress of 110 [ksi])

<Evaluation Method>

Table 2 is a summary of the test conditions and evaluations for the various test specimens.

TABLE 2

| Specimen | | Specimen 1 | Specimen 2 | Specimen 3 | Specimen 4 |
|---|---|---|---|---|---|
| Outer diameter of steel pipe | | 7⅝" | 7⅝" | 7⅝" | 10⅛" |
| Distance starting at initiation of make-up until completion | | | | | |
| inner thread | L1 | 60.0 | 40.0 | 33.3 | 53.6 |
| outer thread | L2 | 69.7 | 40.0 | 33.3 | 53.6 |
| Inner thread contact determination | | | | | |
| contact if X2 > x1 + L1 | x1 + L1 | −6.1 | −27.6 | −37.6 | −13.1 |
| | X2 | −19.7 | −16.0 | −15.2 | −8.1 |
| | determination | non-contact | contact | contact | contact |
| | contact length | | 11.6 | 22.5 | 5.0 |

TABLE 2-continued

| Specimen | | Specimen 1 | Specimen 2 | Specimen 3 | Specimen 4 |
|---|---|---|---|---|---|
| Outer thread contact determination | | | | | |
| contact if $U_2 > u_1 + L_2$ | u1 + L2 | 100.9 | 71.8 | 63.8 | 78.0 |
| | U2 | 117.0 | 110.3 | 108.7 | 115.7 |
| | determination | contact | contact | contact | contact |
| | contact length | 16.1 | 38.6 | 44.9 | 37.7 |
| Result of actual test | | galling on outer threads | passed | passed | passed |
| Other | | comparative | inventive | inventive | inventive |

<Test Results>

In Specimen 1, at the initiation of make-up, only the outer threads were in contact and the inner threads were not in contact, resulting in an unstable contact. As such, as the make-up proceeded, excess loads were applied to the outer threads such that galling occurred on the outer threads upon the first make-up/break-out test.

In Specimens 2 to 4, the inner threads started to be in contact substantially at the same time as the outer threads, resulting in a stable contact from the initiation of make-up until the completion of make-up. As such, uniform loads were applied to both the inner and outer threads and no galling occurred, where three make-up/break-out tests were successful.

EXPLANATION OF CHARACTERS

10: pin
12: nose
13: pin inner sealing surface
14: inner male thread
16: pin intermediate sealing surface
17: outer male thread
18: pin intermediate shoulder surface
20: box
22: recess
23: box inner sealing surface
24: inner female thread
26: box intermediate sealing surface
27: outer female thread
28: box intermediate shoulder surface
141: pin inner perfect thread portion
171: pin outer perfect thread portion
241: box inner perfect thread portion
271: box outer perfect thread portion
141i, 171i, 241i, 271i: inner ends
141o, 171o, 241o, 271o: outer ends

The invention claimed is:

1. A threaded connection for steel pipe, comprising:
a tubular pin; and
a tubular box, the pin being screwed into the box such that the pin and the box are made up,
the pin including:
a tapered inner male thread provided on an outer periphery of the pin and located adjacent to a tip of the pin;
a tapered outer male thread provided on the outer periphery of the pin and located adjacent to an end of the pin opposite to the tip; and
a pin intermediate shoulder surface located between the inner male thread and the outer male thread,
the box including:
a tapered inner female thread provided on an inner periphery of the box to correspond to the inner male thread;
a tapered outer female thread provided on the inner periphery of the box to correspond to the outer male thread; and
a box intermediate shoulder surface facing the pin intermediate shoulder surface, the box intermediate shoulder surface being in contact with the pin intermediate shoulder surface when the pin and the box are made up,
wherein each of the inner male thread, the outer male thread, the inner female thread and the outer female thread includes a perfect thread portion, and each of the perfect thread portions includes an inner end located adjacent to the tip of the pin and an outer end located adjacent to the end of the pin opposite to the tip,
the pin and the box, when made up, have a longitudinal cross section containing an axis of the steel pipe, and an orthogonal coordinate system introduced in the longitudinal cross section has an x-axis represented by the axis of the steel pipe, a y-axis represented by a radius of the steel pipe, and an origin (0,0) represented by an intersection of (a), a plane containing the pin intermediate shoulder surface and the box intermediate shoulder surface and (b) the axis of the steel pipe, and
the threaded connection satisfies the following expressions, Expressions (1) and (2):

$$x_1 + L_1 < X_2 \qquad (1), \text{ and}$$

$$u_1 + L_2 < U_2 \qquad (2),$$

where, in Expressions (1) and (2), $$L_1 = \frac{(\beta_{pi} - \beta_{bi})}{\alpha_{pi}},$$

$$L_2 = \frac{(\beta_{po} - \beta_{bo})}{\alpha_{po}},$$

$$\alpha_{pi} = \frac{y_2 - y_1}{x_2 - x_1},$$

$$\alpha_{po} = \frac{v_2 - v_1}{u_2 - u_1},$$

$$\beta_{pi} = \frac{-x_1 y_2 + x_2 y_1}{x_2 - x_1},$$

$$\beta_{po} = \frac{-u_1 v_2 + u_2 v_1}{u_2 - u_1},$$

$$\beta_{bi} = \frac{-X_1 Y_2 + X_2 Y_1}{X_2 - X_1}, \text{ and}$$

$$\beta_{bo} = \frac{-U_1 V_2 + U_2 V_1}{U_2 - U_1},$$

($x_1, y_1$) denote the coordinates of the inner end of the perfect thread portion of the inner male thread;
($x_2, y_2$) denote the coordinates of the outer end of the perfect thread portion of the inner male thread;

($u_1,v_1$) denote the coordinates of the inner end of the perfect thread portion of the outer male thread;

($u_2,v_2$) denote the coordinates of the outer end of the perfect thread portion of the outer male thread;

($X_1,Y_1$) denote the coordinates of the inner end of the perfect thread portion of the inner female thread;

($X_2,Y_2$) denote the coordinates of the outer end of the perfect thread portion of the inner female thread;

($U_1,V_1$) denote the coordinates of the inner end of the perfect thread portion of the outer female thread; and ($U_2,V_2$) denote the coordinates of the outer end of the perfect thread portion of the outer female thread.

2. The threaded connection for steel pipe according to claim 1, wherein the pin further includes:

a nose provided at the tip of the pin;

a pin inner sealing surface located between the nose and the inner male thread; and a pin intermediate sealing surface provided between the outer male thread and the pin intermediate shoulder surface, and the box further includes:

a box inner sealing surface facing the pin inner sealing surface, the box inner sealing surface being in contact with the pin inner sealing surface when the pin and the box are made up; and a box intermediate sealing surface facing the pin intermediate sealing surface, the box intermediate sealing surface being in contact with the pin intermediate sealing surface when the pin and the box are made up.

3. The threaded connection for steel pipe according to claim 1, wherein the pin intermediate sealing surface has a smaller diameter than an envelope line of a crest of the outer female thread.

4. The threaded connection for steel pipe according to claim 1, further satisfying the following expressions, Expressions (3) and (4):

$$X_2-(x_1+L_1) \geq 5 \text{ mm} \qquad (3), \text{ and}$$

$$U_2-(u_1+L_2) \geq 5 \text{ mm} \qquad (4).$$

* * * * *